(12) United States Patent
Meyer

(10) Patent No.: US 6,601,307 B2
(45) Date of Patent: Aug. 5, 2003

(54) ANGLE MEASURING SYSTEM AND METHOD OF MOUNTING IT

(75) Inventor: Hermann Meyer, Schneizlreuth (DE)

(73) Assignee: Dr. Johannes Heidenhain GmbH, Traunreat (DE)

( * ) Notice: Subject to any disclaimer, the term of this patent is extended or adjusted under 35 U.S.C. 154(b) by 0 days.

(21) Appl. No.: 10/022,177

(22) Filed: Dec. 13, 2001

(65) Prior Publication Data

US 2002/0078761 A1 Jun. 27, 2002

(30) Foreign Application Priority Data

Dec. 16, 2000 (DE) ......................................... 100 63 013

(51) Int. Cl.[7] ............................. G01D 5/02; G01D 5/26
(52) U.S. Cl. ................................ 33/1 PT; 248/231.21; 310/51; 310/91
(58) Field of Search .................. 310/91, 51, 68 B; 33/1 PT, 572; 248/560, 605, 651, 652, 665, 666, 231.21; 250/231.13

(56) References Cited

U.S. PATENT DOCUMENTS 5,758,427 A  6/1998  Feichtinger et al. ........ 33/1 PT
5,771,594 A * 6/1998  Feichtinger ................. 33/1 PT
6,098,295 A * 8/2000  Feichtinger ................. 33/1 PT

FOREIGN PATENT DOCUMENTS

EP    0 762 082    3/1997

* cited by examiner

*Primary Examiner*—Burton Mullins
(74) *Attorney, Agent, or Firm*—Brinks Hofer Gilson & Lione

(57) ABSTRACT

An angle measuring system that includes a stator and a rotor for measuring an angular position between a stationary first object and a second object, which is rotatable about an axis of rotation. A coupling couples the stator to the stationary first object so that the stator is fixed against relative twisting, but is also radially and/or axially resilient. A mounting element that clamps a face of the stationary first object by expanding in a radial direction with respect to the axis of rotation. An expansion element that interacts with the mounting element so as to cause the expanding in a radial direction and a screw that actuates the expansion element, wherein the screw is screwed into the stationary first object.

12 Claims, 2 Drawing Sheets

ANGLE MEASURING SYSTEM AND
METHOD OF MOUNTING IT

Applicant claims, under 35 U.S.C. §119, the benefit of priority of the filing date of Dec. 16, 2000 of a German patent application, copy attached, Serial Number 100 63 013.8, filed on the aforementioned date, the entire contents of which is incorporated herein by reference.

BACKGROUND OF THE INVENTION

1. Field of the Invention

The present invention relates to an angle measuring system, having a stator and a rotor for measuring the angular position between a stationary object and an object which is rotatable with respect to it, a coupling for the stator and the stationary object and a mounting element with an expansion element on the coupling. The present invention further relates to a method for mounting the angle measuring system on a drive mechanism.

2. Discussion of Related Art

Couplings for the connection, fixed against relative rotation, of a scanning device, a housing or an installation flange of the angle measuring system with a stationary element of a drive mechanism, are employed in angle measuring systems.

An angle measuring system with such a coupling is described in U.S. Pat. No. 5,758,427, the entire contents of which are incorporated herein. There, the shafts of the angle measuring system and the drive mechanism are connected with each other rigidly without an adjustment possibility, and the stators are connected with each other resiliently, but fixed against relative rotation, by a parallel guide device. Tumbling movements of the shafts are optimally compensated by two parallel guide devices arranged perpendicularly with respect to each other, without the stators being able to twist with respect to each other. In this case, the coupling does not perform rotary movements around the axis of rotation to be measured. Fastening of the coupling on the drive mechanism is provided by radial clamping between the coupling and a stationary portion of the drive mechanism. For this purpose, the coupling is preferably fastened on a ring-shaped mounting element, and the mounting element can be radially expanded by an expansion element and can therefore be clamped on a tube-shaped inner surface of the drive mechanism. The expansion element is aligned parallel with respect to the axis of rotation and is accessible. It is therefore necessary to make a relatively large clear space available for operating the expansion element.

OBJECTS AND SUMMARY OF THE INVENTION

It is therefore an object of the present invention to create an angle measuring system, which can be mounted in an extremely space-saving and simple manner, and assures exact coupling as well.

This object is attained by an angle measuring system that includes a stator and a rotor for measuring an angular position between a stationary first object and a second object, which is rotatable about an axis of rotation. A coupling couples the stator to the stationary first object so that the stator is fixed against relative twisting, but is also radially and/or axially resilient. A mounting element that clamps a face of the stationary first object by expanding in a radial direction with respect to the axis of rotation. An expansion element that interacts with the mounting element so as to cause the expanding in a radial direction and a screw that actuates the expansion element, wherein the screw is screwed into the stationary first object.

It is further intended to disclose a method for mounting an angle measuring system on a drive mechanism, which is simple to perform.

This object is attained by a method for mounting an angle measuring system to a drive mechanism that includes providing a drive mechanism that has a stationary first object and a first shaft that rotates about an axis of revolution and providing an angle measuring system that has a stator and a second shaft for measuring an angular position between the stationary first object of the drive mechanism and the second shaft of the drive mechanism. Fastening a coupling to the stator of the angle measuring system and fastening the coupling to the stationary first object of said drive mechanism via a mounting element so that the coupling is fixed against relative twisting, but is radially and/or axially resilient. Clamping the mounting element on an interior face of the first stationary object of the drive mechanism by inserting an expansion element into the stationary first object of the drive mechanism so as to cause a radial expansion of the mounting element so as to be fixed against relative rotation. Connecting the second shaft of the angle measuring system to the first shaft of the drive mechanism so as to be fixed against relative rotation.

The advantages which can be achieved by the present invention particularly lie in that the angle measuring system can be mounted simply and in a space-saving manner. The radial, and particularly the axial production tolerances of the elements needed for mounting can be relatively large. Since the axial mounting position is not already determined during the production, it is possible to mount angle measuring systems with a stator without a bias in the axial direction on a drive mechanism by means of a coupling. The accuracy of the angle measuring system is increased by this.

Further advantages, as well as details of the present invention, ensue from the following description of a preferred embodiment represented in the drawings.

DETAILED DESCRIPTION OF THE PREFERRED EMBODIMENTS

Figure 1:
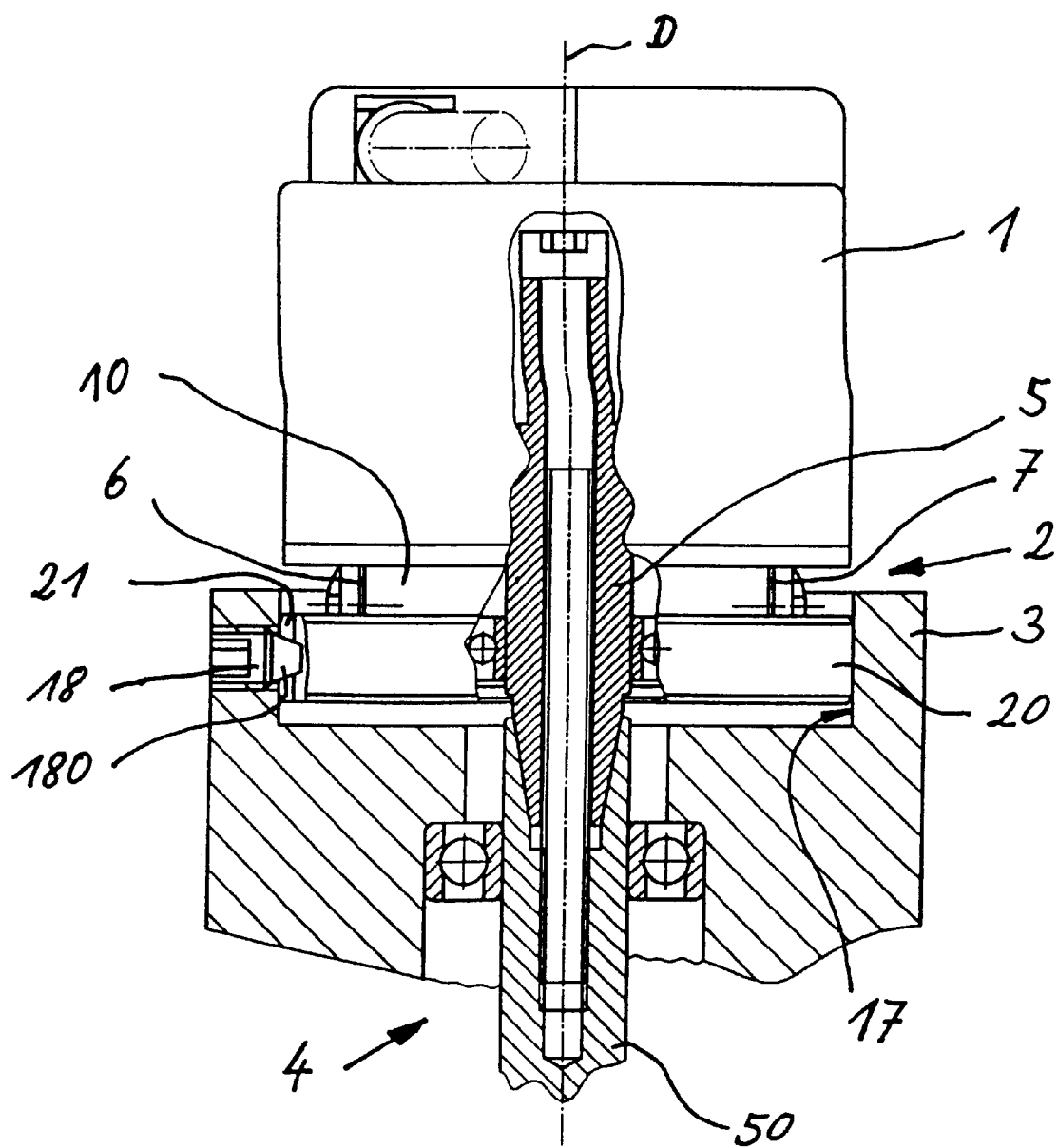
FIG. 1 shows a cross section through an embodiment of an angle measuring system with a coupling according to the present invention.

The stator 10 of an angle measuring system 1 represented in FIG. 1 is connected, fixed against relative rotation, with the stator 3 of a drive mechanism 4 via a coupling 2. A rotor of the angle measuring system 1 includes a rotating shaft 5 that is rigidly coupled to the rotating shaft 50 or the rotor of the drive mechanism 4. The stator 3 of the drive mechanism 4 is, for example, the stationary portion of a motor, in particular the motor flange. The stator 10 of the angle measuring system 1 is a stationary portion of the angle measuring system 1, for example a mounting flange, the scanning device or the housing of the angle measuring system 1. The angular position of the shaft 50 in relation to the stationary object 3 is measured in that a graduated disk connected to the shaft 5 is scanned in a known manner by a scanning device. The mounting flange, the housing, as well as the scanning device form part of the stator 10 of the angle measuring system 1. The coupling 2 is provided for fastening the stator 10 in a manner fixed against relative twisting, but radially and axially resilient, on the stationary object 3 of the drive mechanism 4.

The coupling 2 includes two spring parallelograms, each with two leaf spring arms 6, 7, as well as leaf spring arms 8, 9, which extend parallel with each other. The free ends of the axis-parallel spring leaf arms 6 and 7 are connected by screws with the stator 10 of the angle measuring system 1, and the other leaf spring arms 8 and 9, extending perpendicular with respect to the other leaf arms 6 and 7, are fastened, for example welded, to a ring-shaped mounting element 20.

Figure 2:
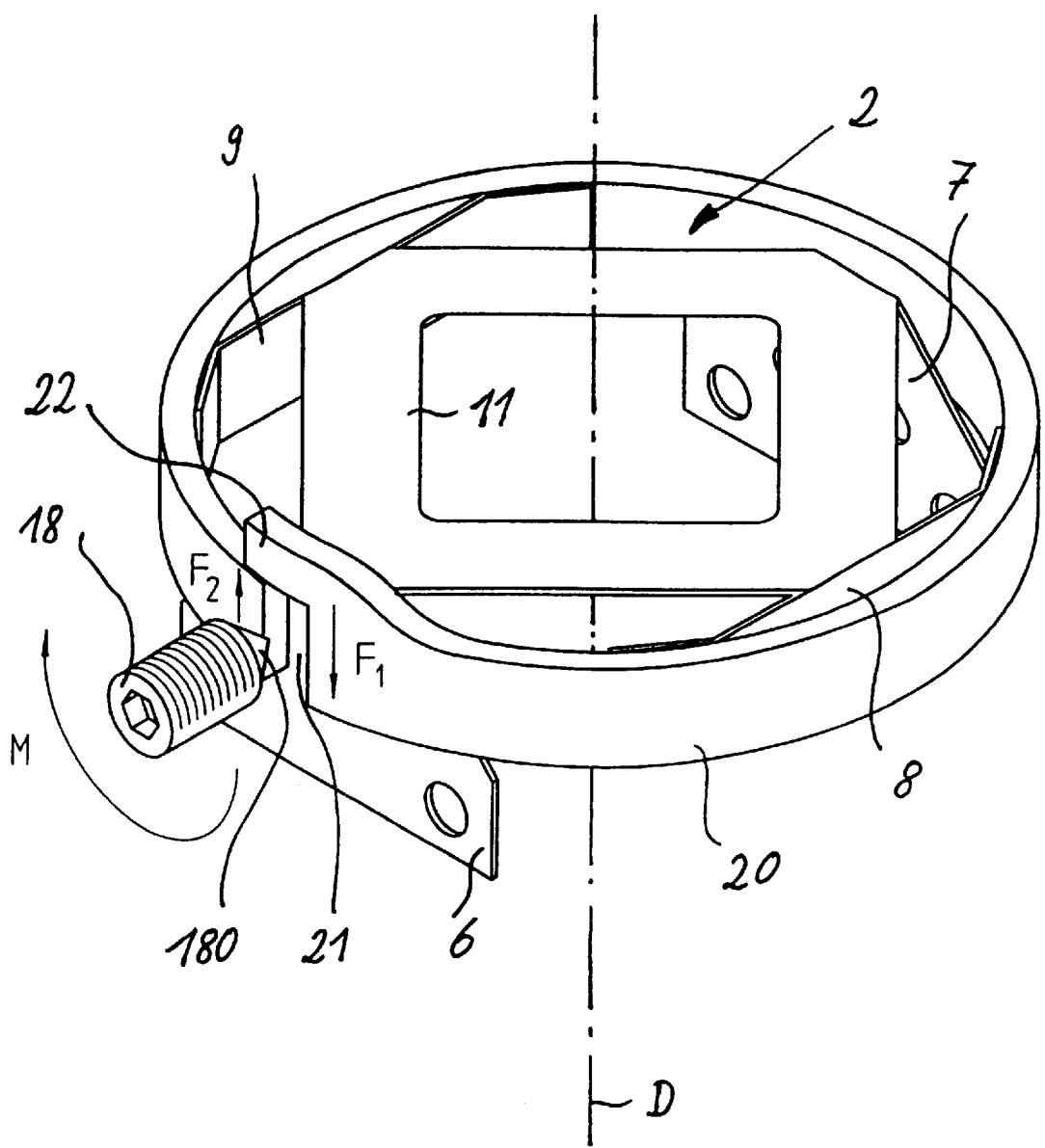
FIG. 2 is a perspective view of an embodiment of a coupling used with the angle measuring system of FIG. 1 according to the present invention.

The coupling 2, perspectively represented in FIG. 2, is embodied in one piece as a punched-and-bent element and produced from a material with high fatigue strength, for example spring steel. The coupling 2 has a level center area 11 with four leaf spring arms 6, 7, 8, 9 extending essentially parallel with respect to the axis of rotation D of the shafts 5, 50, of which respectively two spring arms (6 and 7, or 8 and 9) are arranged diametrically opposite each other. The leaf spring arms 6, 7, 8, 9 are aligned, at least to a large extent, parallel with the common axis of rotation D of the shafts 5, 50. They are arranged in pairs diametrically opposite and parallel with each other and therefore form two spring parallelograms arranged perpendicularly with respect to each other, which assure a connection which is fixed against relative twisting, but is radially resilient, of the stator 3 of the drive mechanism 4 with the stator 10 of the angle measuring system 1. In particular, the leaf spring arms 6 and 7 are parallel to one another as viewed along a direction X that is parallel to the area 11 and perpendicular to a direction Y that is parallel to the area 11 and is perpendicular to the arms 6 and 7. Thus, the leaf spring arms 6 and 7 form a spring parallelogram as viewed in the direction X. Similarly, the leaf spring arms 8 and 9 form a spring parallelogram as viewed in the direction Y. The spring parallelogram defined by leaf spring arms 6 and 7 permit radial movement of the angle encoder 1 with respect to the stator 3 along the Y direction. The spring parallelogram defined by leaf spring arms 8 and 9 permit radial movement of the angle encoder 1 with respect to the stator 3 along the X direction. Rotary movement about the axis of rotation D is prevented since the spring arms 6, 7, 8 and 9 are rigid in the circumferential direction.

For receiving the angle measuring system 1, the stator 3 of the drive unit 4 has a barrel 17 of a defined interior diameter matched to the exterior diameter of the mounting element 20. Advantageously the barrel 17 is constituted by an inner circumferential face of the motor flange 3.

The preassembled unit, including the angle measuring system 1 with the coupling 2 and the mounting element 20, is inserted into the barrel 17, and the mounting element 20 is fixed in place in the barrel 17 by an expansion element 180. By this step the unit including the stator 10 of the angle measuring unit 1, the coupling 2 and the mounting element 20, are fixed in place in the drive unit 4 in the simplest manner.

The mounting element 20 is designed to be sufficiently strong for receiving and transmitting the expansion force of the expansion element 180, so that the ring-shaped mounting element is radially widened and the smallest possible force acts on the coupling 2, so that it is not deformed during mounting, if possible.

For radially expanding the mounting element 20, its two ends are spaced apart on the circumference of mounting element 20, and the ends form a gap 21 extending in the axial direction. This gap 21 divides the mounting element 20 in such a way that the exterior diameter of the mounting element 20 can be enlarged by the expansion element 180 acting in the gap 21.

The expansion element 180 includes the conical end of a screw 18, which has been radially screwed into a threaded bore of the stator 3 of the drive mechanism 4 and enters the gap 21 with the conical end. The oppositely located ends of the mounting element 20 are advantageously conically designed and matched to the cone of the screw 18. For actuation, the screw 18 is easily accessible from the exterior of the stator 3 of the drive mechanism 4, and the threaded bore is tightly sealed by the screw 18. To make the mounting free of axial tensions possible, the shafts 5, 50 are coupled with each other fixed against relative rotation in a first method step, and the axial position of the mounting element 20 is predetermined by this. In a second mounting step the mounting element 20 is radially clamped to the stator 3 in this position. The permissible axial mounting tolerance of the mounting element 20 with respect to the stator 3 is predetermined by the axial width of the gap 21 and is therefore relatively large. In this case, the relative width of the gap 21 is greater than the width of the area of the conical end of the screw 18 which acts on the ends of the mounting element 20.

The expansion element 180 can also be a separate element, which is being actuated by the screw 18.

The conical end of the screw 18 is supported on the two ends of the mounting element 20 when the screw 18 is screwed in, and a torque M acts on the mounting element 20 with the forces F1 and F2 represented in FIG. 2. To prevent a mutual displacement of the ends of the mounting element 20 because of these forces F1, F2, a twist prevention in the form of an axially acting interlock of the two ends is provided. This interlocking connection is, for example, a finger-like extension 22 on the one side of an end of the mounting element 20, which laterally bridges the gap 21 and is laterally supported at the other end of the mounting element 20, i.e. in the axial direction. Together with the other end of the mounting element 20, the extension 22 forms axially acting stops. The extension 22 is formed in one piece on the mounting element 20, or is welded to it.

In the exemplary embodiment so far described, the coupling 2 is fastened by screws on the angle measuring system 1. As a rule, these screws can be easily inserted. But, if for reasons of space, problems should arise during preassembly, there is the possibility of providing a mounting element, preferably a ring, here, too, on which the coupling is fastened and which can be connected, fixed against relative rotation, by radial clamping with the stator of the angle measuring system.

It is particularly advantageous to utilize a ring-shaped mounting element 20, because even clamping over the circumference is made possible by this.

Mounting in accordance with the present invention opens up a simple possibility for installing the angle measuring system 1 directly inside the flange 3 of a motor 4, i.e. in the end plate of the motor.

In the specification, the term "radial" defines a direction which extends, at least to a large degree, perpendicularly to the axis of rotation D. "Axial" defines a direction extending parallel with respect to the axis of rotation D.

The present invention can be employed in connection with an angle measuring system 1 having incremental, as well as absolute, angle encoders, multiturn potentiometers, revolution counters, resolvers, as well as speed measuring devices. The scanning principle of the measurement representation can be optical, magnetic, capacitive or inductive here.

The foregoing description is provided to illustrate the invention, and is not to be construed as a limitation. Numerous additions, substitutions and other changes can be made to the invention without departing from its scope as set forth in the appended claims.

I claim:

1. An angle measuring system, comprising:
   a stator and a rotor for measuring an angular position between a stationary first object and a second object, which is rotatable about an axis of rotation;
   a coupling that couples said stator to said stationary first object so that said stator is fixed against relative twisting, but is also radially and/or axially resilient;
   a mounting element attached to said coupling, wherein said mounting element clamps a face of said stationary first object by expanding in a radial direction with respect to said axis of rotation;
   an expansion element that interacts with said mounting element so as to cause said expanding in a radial direction; and
   a screw that actuates said expansion element, wherein said screw is screwed into said stationary first object.

2. The angle measuring system of claim 1, wherein said screw comprises said expansion element.

3. The angle measuring system of claim 1, wherein said mounting element comprises a first end and a second end and is ring-shaped, said first end and said second end of said mounting element are spaced apart and form a gap extending in an axial direction with respect to said axis of rotation.

4. The angle measuring system of claim 3, wherein said expansion element enters into said gap and acts on said first and second ends of said mounting element.

5. The angle measuring system of claim 1, wherein said expansion element is a conical end of said screw.

6. The angle measuring system of claim 3, wherein said first end and said second end of said mounting element have an oppositely axially acting interlocking connection.

7. The angle measuring system of claim 6, wherein said interlocking connection comprises a first stop and a second stop, which are effective in said axial direction on said first end and said second end of said mounting element.

8. The angle measuring system of claim 1, wherein said screw is screwed into said stationary first object in a direction radial with respect to said axis of rotation.

9. The angle measuring system of claim 1, wherein said screw is screwed into a motor flange of a motor.

10. A method for mounting an angle measuring system to a drive mechanism, comprising:
    providing a drive mechanism that comprises a stationary first object and a first shaft that rotates about an axis of revolution;
    providing an angle measuring system that comprises a stator and a second shaft for measuring an angular position between said stationary first object of said drive mechanism and said second shaft of said drive mechanism;
    fastening a coupling to said stator of said angle measuring system;
    fastening said coupling to said stationary first object of said drive mechanism via a mounting element so that said coupling is fixed against relative twisting, but is radially and/or axially resilient;
    clamping said mounting element on an interior face of said first stationary object of said drive mechanism by inserting an expansion element into said stationary first object of said drive mechanism so as to cause a radial expansion of said mounting element so as to be fixed against relative rotation; and
    connecting said second shaft of said angle measuring system to said first shaft of said drive mechanism so as to be fixed against relative rotation.

11. The method of claim 10, wherein said inserting comprises screwing said expansion element into said stationary first object of said drive mechanism.

12. The method of claim 11, wherein said screwing is in a radial direction with respect to said axis of rotation.

* * * * *